United States Patent
Hsu et al.

(10) Patent No.: US 9,286,851 B2
(45) Date of Patent: Mar. 15, 2016

(54) DISPLAY PANEL DRIVING DEVICE AND DRIVING METHOD FOR SAVING ELECTRICAL ENERGY THEREOF

(75) Inventors: Chen-Ming Hsu, Tainan (TW); Ssu-Chieh Yang, Tainan (TW); Yu-Feng Lin, Tainan (TW); Jung-Tse Lee, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 326 days.

(21) Appl. No.: 13/308,026

(22) Filed: Nov. 30, 2011

(65) Prior Publication Data

US 2013/0044087 A1 Feb. 21, 2013

Related U.S. Application Data

(60) Provisional application No. 61/524,286, filed on Aug. 16, 2011.

(51) Int. Cl.
- G06F 13/00 (2006.01)
- G09G 5/00 (2006.01)
- G06F 3/14 (2006.01)

(52) U.S. Cl.
CPC .............. *G09G 5/003* (2013.01); *G06F 3/1415* (2013.01); *G09G 2320/103* (2013.01); *G09G 2330/021* (2013.01)

(58) Field of Classification Search
CPC ............................... G09G 5/003; G06F 3/1415
USPC .................................................. 345/204, 538
See application file for complete search history.

(56) References Cited

U.S. PATENT DOCUMENTS

| | | | |
|---|---|---|---|
| 7,916,135 B2* | 3/2011 | Kuo et al. | 345/213 |
| 2001/0003448 A1* | 6/2001 | Nose et al. | 345/99 |
| 2002/0021274 A1 | 2/2002 | Koyama et al. | |
| 2003/0169244 A1* | 9/2003 | Kurokawa et al. | 345/204 |
| 2004/0090391 A1* | 5/2004 | Kondo | 345/1.1 |
| 2006/0152501 A1* | 7/2006 | Furihata et al. | 345/204 |
| 2008/0100636 A1* | 5/2008 | Lai et al. | 345/546 |
| 2009/0322969 A1 | 12/2009 | Unger | |

FOREIGN PATENT DOCUMENTS

| | | |
|---|---|---|
| CN | 1500345 | 5/2004 |
| CN | 1804987 | 7/2006 |
| TW | 589476 | 6/2004 |

(Continued)

OTHER PUBLICATIONS

"Office Action of Taiwan Counterpart Application", issued on Dec. 24, 2013, p. 1-p. 10, in which the listed references were cited.

(Continued)

*Primary Examiner* — Adam J Snyder
(74) *Attorney, Agent, or Firm* — J.C. Patents

(57) ABSTRACT

A display panel driving device is provided. The display panel driving device includes a host and a driving chip. The driving chip includes a store unit, a driving module and a transmitting interface unit. The host controls the transmitting interface unit to switch sources of image data received by the driving module according to content of the image data, so as to determine whether the driving module receives the image data from the store unit or not.

6 Claims, 3 Drawing Sheets

(56) References Cited

FOREIGN PATENT DOCUMENTS

| | | |
|---|---|---|
| TW | 200633394 | 9/2006 |
| TW | 201310414 | 3/2013 |

OTHER PUBLICATIONS

"Office Action of Chinese Counterpart Application", issued on Oct. 8, 2014, p. 1-p. 7, in which the listed references were cited.

* cited by examiner

DISPLAY PANEL DRIVING DEVICE AND DRIVING METHOD FOR SAVING ELECTRICAL ENERGY THEREOF

CROSS-REFERENCE TO RELATED APPLICATION

This application claims the priority benefits of U.S. provisional application Ser. No. 61/524,286, filed on Aug. 16, 2011. The entirety of the above-mentioned patent application is hereby incorporated by reference herein and made a part of this specification.

BACKGROUND OF THE INVENTION

1. Field of the Invention

The present invention relates to a display panel driving device and a driving method thereof, and more particularly relates to a display panel driving device which can greatly save electrical energy and a driving method thereof.

2. Description of Related Art

In recent years, with the enhanced environmental protection awareness, the requirements of energy saving are paid much attention. All sorts of mechanical equipments, home appliances and computer products related to the electrical energy are developed for realizing the maximal performance by using the least electrical power.

Regarding a display, generally speaking, in order to achieve the electricity saving of static frames, a panel driving chip is equipped with a Random Access Memory (RAM). If image data content that drives the display panel is static frames (for example, photos), a host of the display stops updating the data in the RAM and the displayed image data may be directly acquired from the RAM. Therefore, the host and the data transfer interface of the driving chip do not necessarily provide the display data, thereby reducing the power consumption.

The conventional driving manner of the display panel may achieve the purpose of electricity saving, but when the image data content that drives the display panel is dynamic frames (for example, a movie), the host of the display must continuously update the data in the RAM. With the increase of the resolution of the screen, the RAM in the driving chip is required to have a large capacity. Hence, the power consumption is increased, which results in that the conventional driving manner of the display panel cannot satisfy the low power consumption requirement in the industrial applications.

SUMMARY OF THE INVENTION

The present invention is directed a display panel driving device, thereby greatly reducing an electrical energy consumed for driving the display.

The present invention provides a display driving device, which includes a host and a driving chip. The host is used to output a switching instruction and image data. The switching instruction is related to content of the image data. The driving chip drives a display panel to display frames according to the image data. The driving chip includes a store unit, a driving module and a transmitting interface unit. The store unit is used to store the image data. The driving module is coupled to the store unit, for driving the display panel to display the frames according to the image data. The transmitting interface unit is coupled to the host, the store unit and the driving module, and is controlled by the switching instruction to transmit the image data to at least one of the store unit and the driving module, so as to determine whether the driving module receives the image data from the store unit or not.

In an embodiment of the present invention, when the content of the image data is dynamic frames, the host disenables the store unit and controls the transmitting interface unit to transfer the image data to the driving module. When the content of the image data is static frames, the host disenables the transmitting interface unit and controls the driving module to receive the image data from the store unit.

In an embodiment of the present invention, the image data includes a plurality of frames. A display period of each frame includes an image data transmitting period and an instructing period. When the content of the image data converts from the dynamic frames to the static frames, the host outputs an enable instruction in an instructing period of the last dynamic frame, so as to enable the store unit to store data of the first static frame in an image data transmitting period of the first static frame, and output the switching instruction in an instructing period of the first static frame, so as to control the driving module to receive data of a second static frame from the store unit in an image data transmitting period of the second static frame.

In an embodiment of the present invention, when the content of the image data converts from the static frames to the dynamic frames, the host outputs a disenable instruction and a switching instruction in the display period of the static frames, so as to respectively disenable the store unit and control the driving module to receive the image data from the transmitting interface unit in the image data transmitting period of the dynamic frames.

In an embodiment of the present invention, the display period of each frame further includes a synchronizing period. The host synchronizes a frame separating signal output by the driving chip in the synchronizing period according to a vertical synchronization signal. The frame separating signal instructs a start point of the display period of each frame.

In an embodiment of the present invention, the host stops providing the image data in the period that the driving module receives the image data from the store unit.

In an embodiment of the present invention, the driving module includes a timing controller and a driving unit. The timing controller is coupled to the transmitting interface unit and the store unit, for outputting a driving clock signal according to the image data. The driving unit is coupled to the timing controller, for driving the display panel to display the frames according to the driving clock signal.

In view of the above description, the present invention determines the sources of the image data received by the driving module according to the content of the image data, so as to effectively reduce the power consumption for driving the display panel.

In order to make the aforementioned features and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
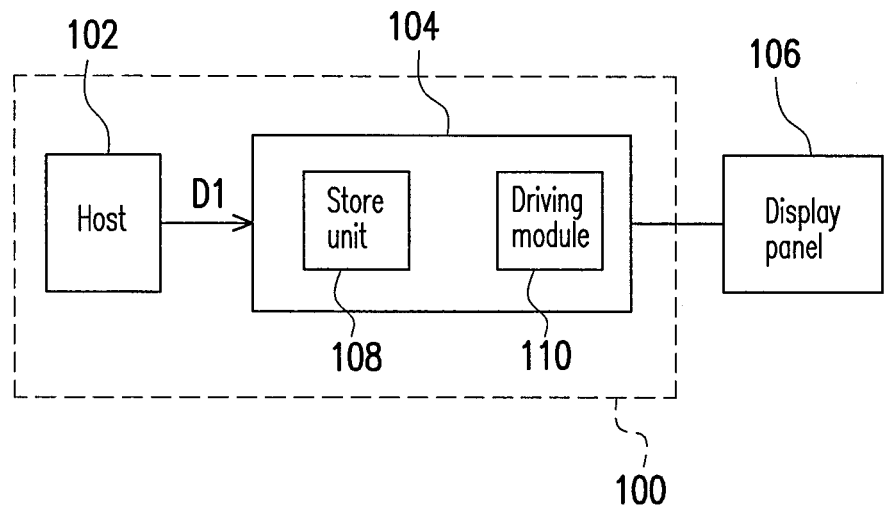
FIG. 1 is a schematic view of a display panel driving device according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic view of a display panel driving device according to an embodiment of the present invention. Referring to FIG. 1, the display panel driving device 100 includes a host 102 and a driving chip 104. The host 102 is used to provide image data D1, and the driving chip 104 is used to drive a display panel 106 to display frames according to the image data D1. As shown in FIG. 1, the driving chip 104 includes a store unit 108 and a driving module 110 coupled to the store unit 108. The store unit 108 is used to store the image data D1 provided by the host 102, and the driving module 110 is used to drive the display panel 106 to display the frames according to the image data.

The host 102 switches sources of the image data D1 received by the driving module 110 according to content of the image data D1. In other words, the host 102 may determine whether the driving module 110 retrieves the image data D1 from the store unit 108 to drive the display panel 106 to display the frames according to the content of the image data D1. For example, when the host 102 determines that the content of the image data D1 is the dynamic frames, the host 102 disenables the store unit 108, so that the driving module 110 directly drives the display panel 106 to display the frames according to the image data D1 transferred from the host 102. When the host 102 determines that the content of the image data D1 is the static frames, the host 102 enables the store unit 108 and stores the image data D1 in the store unit 108, so that the driving module 110 may retrieve the image data D1 from the store unit 108 to drive the display panel 106 to display the frames. When the image data D1 according to which the driving module 110 drives the display panel 106 comes from the store unit 108, the host 102 is not required to provide the image data D1 to the driving chip 104, so the host 102 enters a low power mode to reduce the power consumption.

As described above, by switching the sources of the image data D1 according to which the driving module 110 drives the display panel 106 according to the content of the image data D1, the power consumption may be reduced when the display panel 106 displays the static frames. Furthermore, when the display panel 106 displays the dynamic frames, by driving the display panel 106 directly according to the image data D1 transferred from the host 102, the dynamic frame data is prevented from being continuously written into the store unit 108, thereby greatly reducing the power consumption.

Figure 2:
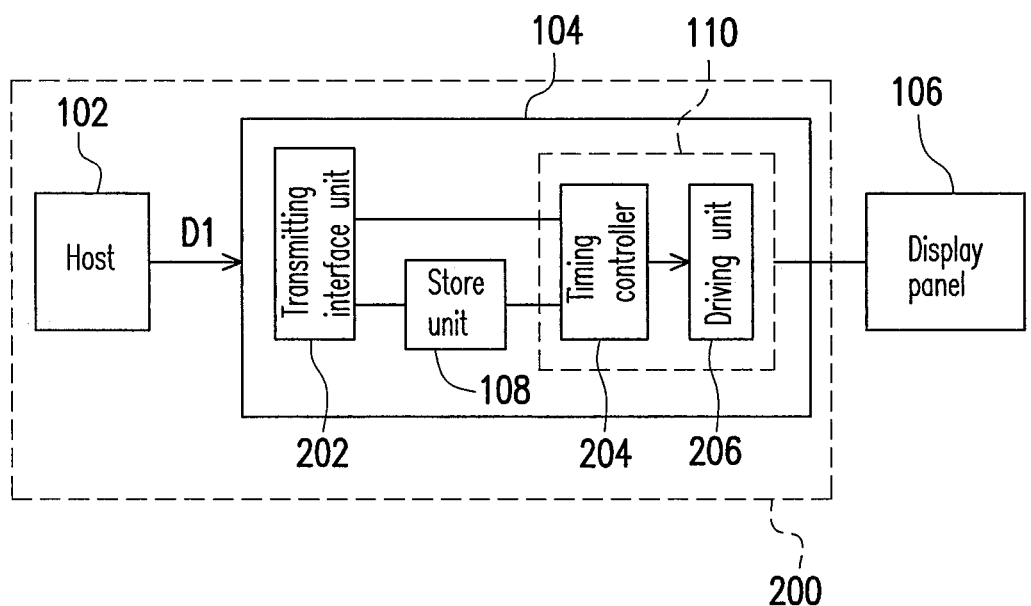
FIG. 2 is a schematic view of a display panel driving device according to another embodiment of the present invention.

FIG. 2 is a schematic view of a display panel driving device according to another embodiment of the present invention. Referring to FIG. 2, the difference between the display panel driving device 200 of this embodiment and the display panel driving device 100 lies in that the driving chip 104 in the display panel driving device 200 may further include a transmitting interface unit 202 coupled to the host 102, the store unit 108 and the driving module 110. In addition, the driving module 110 may include a timing controller 204 and a driving unit 206. The timing controller 204 is coupled to the transmitting interface unit 202 and the store unit 108, and the driving unit 206 is coupled to the timing controller 204 and the display panel 106. The timing controller 204 is used to output a driving clock signal SD1 according to the image data D1, and the driving unit 206 is used to drive the display panel 106 to display the frames according to the driving clock signal SD1.

The transmitting interface unit 202 may be, for example, a Mobile Industry Processor Interface (MIPI) Display Serial Interface (DSI), which is controlled by a switching instruction output by the host 102 to transfer the image data D1 to at least one of the store unit 108 and the driving module 110, so as to determine whether the driving module 110 receives the image data D1 from the store unit 108 or not, thereby achieving the purpose of reducing power consumption. The switching instruction is related to the content of the image data D1. When the content of the image data D1 is the dynamic frames or the static frames, the sources of the image data D1 according to which the driving module 110 drives the display panel 106 are illustrated in the embodiment of FIG. 1, so the details will not be repeated herein. It should be noted that when the content of the image data D1 is the static frames, that is, in the period that the image data D1 according to which the driving module 110 drives the display panel 106 comes from the store unit 108, the transmitting interface unit 202 is not required to transfer the image data D1. Therefore, the host 102 may disenable the transmitting interface unit 202 in this period, and controls the driving module 110 to receive the image data D1 from the store unit 108, thereby further reducing the power consumption.

Figure 3:
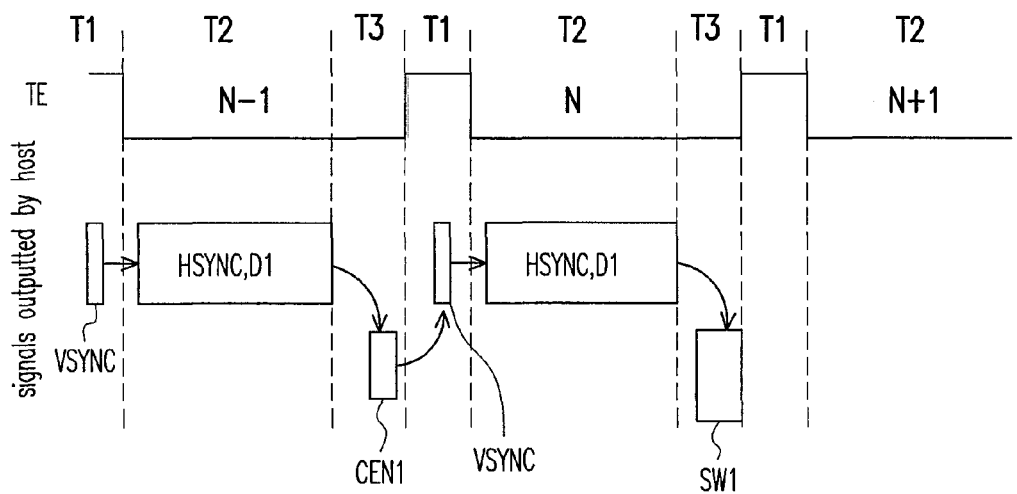
FIG. 3 is a schematic view of driving a display panel when content converts from dynamic frames to static frames according to an embodiment of the present invention.

In details, when the content of the image data D1 converts from the dynamic frames to the static frames, the host 102 enables the store unit 108, and controls the transmitting interface unit 202 to transmit the image data D1 to the store unit 108 and the driving module 110 at the same time. FIG. 3 is a schematic view of driving the display panel when the content converts from the dynamic frames to the static frames. Referring to FIG. 3, the image data D1 includes a plurality of frames. A display period of each frame includes a synchronizing period T1, an image data transmitting period T2 and an instructing period T3. The synchronizing period T1 is used to execute a synchronization action between the image data D1 and a frame separating signal TE output by the driving chip 104. The image data transmitting period T2 is used to transmit a horizontal synchronization signal HSYNC and the image data D1. The instructing period T3 is used to transmit the instructions sent by the host 102.

The host 102 synchronizes the frame separating signal TE output by the driving chip 104 in the synchronizing period T1 according to a vertical synchronization signal VSYNC. The frame separating signal TE instructs a start point of each frame display period. In other words, a time point at which the frame separating signal TE converts to a high logic level is the start point of a frame.

When the content of the image data D1 converts from the dynamic frames to the static frames, the host 102 outputs an enable instruction CEN1 in an instructing period T3 of the last dynamic frame (that is, an $(N-1)^{th}$ frame as shown in FIG. 3), so as to enable the store unit 108. In this manner, the store unit 108 may store data of the first static frame in an image data transmitting period T2 of the first static frame (that is, an $N^{th}$ frame as shown in FIG. 3). The host 102 outputs a switching instruction SW1 in an instructing period T3 of the first static frame, so as to control the driving module 110 to receive the data of the first static frame from the store unit 108 in an image data transmitting period T2 of a second static frame (that is, an (N+1)$^{th}$ frame as shown in FIG. 3). In this manner, the quality of the display frame is prevented from being affected when the content converts from the dynamic frames to the static frames. In addition, the host 102 is not required to provide the image data D1 to the driving chip 104 at the start of the second static frame, and may enter a low power mode to reduce the power consumption. In addition, the transmitting interface unit 202 is not required to transmit the image data D1 and may be disenabled to further reduce the power consumption.

Figure 4:
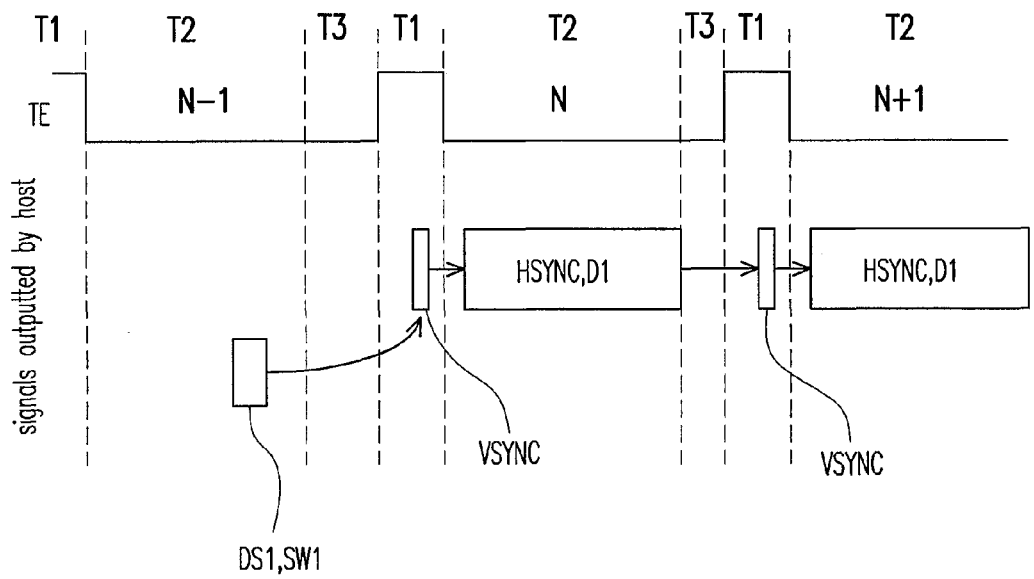
FIG. 4 is a schematic view of driving the display panel when the content converts from the static frames to the dynamic frames according to an embodiment of the present invention.

Additionally, when the content of the image data D1 converts from the static frames to the dynamic frames, the actuation of the driving display panel 106 is shown in FIG. 4. When the content of the image data D1 converts from the static frames to the dynamic frames, the host 102 is waken from the low power mode at the last static frame (that is, an (N−1)$^{th}$ frame as shown in FIG. 4), and sends a disenable instruction DS1 and a switching instruction SW1, so as to respectively disenable the store unit 108 and control the driving module 110 to receive the image data D1 from the transmitting interface unit 202 in the image data transmitting period T2 starting from the dynamic frames (an N$^{th}$ frame and an (N+1)$^{th}$ frame as shown in FIG. 4). In this manner, the image data D1 is prevented from being continuously written in the store unit 108 in the period that the content of the image data D1 is the dynamic frames, thereby greatly reducing the power consumption. It should be noted that when the content of the image data D1 is the static frames, the host 102 is not required to provide the image data D1, so a time point at which the host 102 sends the disenable instruction DS1 and the switching instruction SW1 is not limited within the instruction period T3 of the (N−1)$^{th}$ frame.

Figure 5:
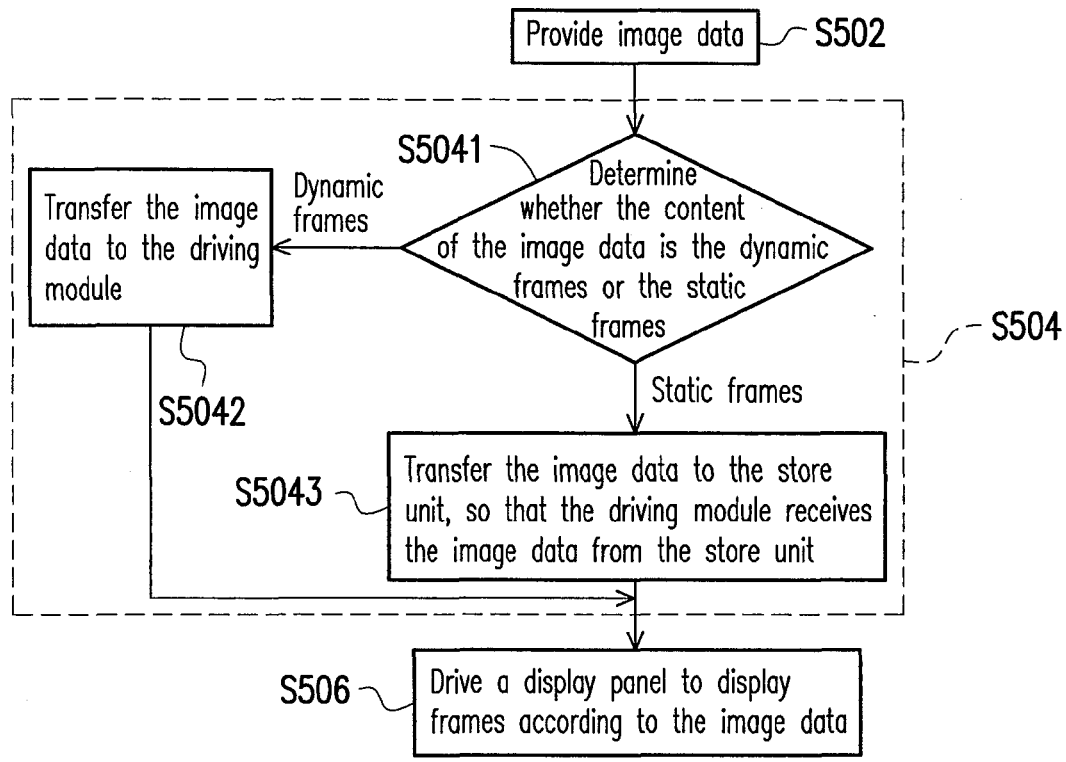
FIG. 5 is a flow chart of a display panel driving method according to an embodiment of the present invention.

FIG. 5 is a flow chart of a display panel driving method according to an embodiment of the present invention. Referring to FIG. 5, in view of the above, the display panel driving method may include the following steps. Firstly, image data is provided (step S502). Then, sources of the image data received by a driving module are switched according to content of the image data, so as to determine whether the driving module receives the image data from a store unit or not (step S504), in which the content of the image data may be dynamic frames or static frames. At last, a display panel is driven to display frames according to the image data (step S506).

In details, the step S504 may include firstly determining whether the content of the image data is the dynamic frames or the static frames (step S5041). If the content of the image data is the dynamic frames, the image data is transferred to the driving module (step S5042). If the content of the image data is the static frames, the image data is transferred to the store unit, so that the driving module receives the image data from the store unit (step S5043). When the content of the image data is the dynamic frames, the store unit may be disenabled to prevent continuously writing the image data into the store unit, thereby reducing the power consumption. In the period that the driving module receives the image data from the store unit, as the image data of the driving display panel is provided by the store unit, the image data is not required to be provided to the driving module, thereby reducing the power consumption.

Figure 6:
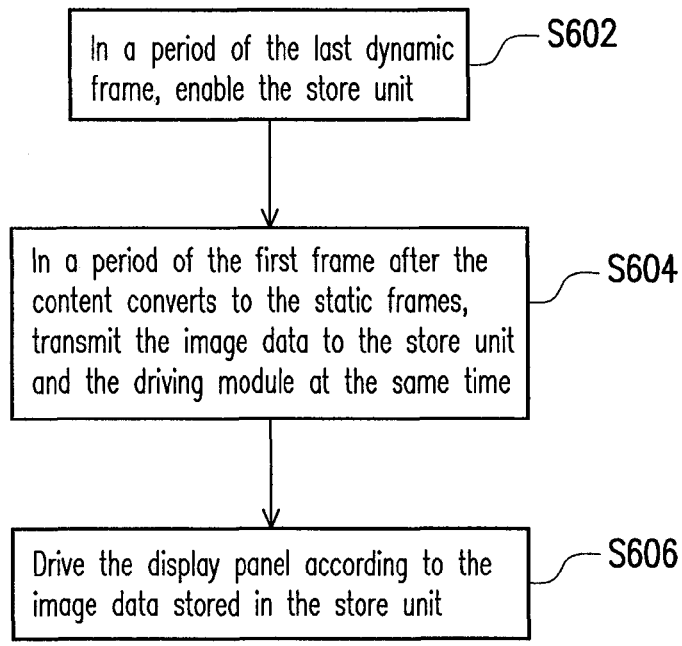
FIG. 6 is a flow chart of driving the display panel when the content converts from the dynamic frames to the static frames.

FIG. 6 is a flow chart of driving the display panel when the content converts from the dynamic frames to the static frames. Firstly, when the content of the image data converts from the dynamic frames to the static frames, in a period of the last dynamic frame, the store unit is enabled (step S602). Subsequently, in a period of the first frame after the content converts to the static frames, the image data is transmitted to the store unit and the driving module at the same time (step S604). Then, the display panel is driven according to the image data (that is, the static frames) stored in the store unit (step S606). In this manner, the quality of the display frame is prevented from being affected when the content converts from the dynamic frames to the static frames.

In view of the above, the present invention determines the sources of the image data received by the driving module according to the content of the image data, so as to effectively reduce the power consumption for driving the display panel. When the content of the image data is the dynamic frames, the image data is directly transferred to the driving module. When the content of the image data is the static frames, the store unit provides the image data to the driving module. Moreover, when the content converts from the dynamic frames to the static frames, the image data is transferred to the driving module and the store unit at the same time, so as to prevent from affecting the frame quality of the display panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display panel driving device, comprising:
   a host, outputting a switching instruction and image data, wherein the switching instruction is related to content of the image data; and
   a driving chip, for driving a display panel to display frames according to the image data, the driving chip comprising:
   a store unit, for storing the image data;
   a driving module, coupled to the store unit, for driving the display panel to display the frames according to the image data; and
   a transmitting interface unit, coupled to the host, the store unit and the driving module, and controlled by the switching instruction to transmit the image data to at least one of the store unit and the driving module, so as to determine whether the driving module receives the image data from the store unit, wherein the image data comprises a plurality of frames, a display period of each frame comprises an image data transmitting period, an instructing period, and a synchronizing period including a frame separating signal, when the content of the image data converts from static frames to dynamic frames, the host outputs a disenable instruction and the switching instruction in the image data transmitting period of the last static frames before the synchronizing period of the first dynamic frame, so as to respectively completely disenable the store unit throughout a period for displaying entire dynamic frames and control the driving module to receive the image data from the transmitting interface unit in the image data transmitting period of the dynamic frames.

2. The display panel driving device according to claim 1, wherein when the content of the image data is the dynamic frames, the host completely disenables the store unit and controls the transmitting interface unit to transfer the image data to the driving module, and when the content of the image data is the static frames, the host controls the transmitting interface unit to transfer the image data to the store unit, disenables the transmitting interface unit, and controls the driving module to receive the image data from the store unit.

3. The display panel driving device according to claim 1, wherein when the content of the image data converts from the dynamic frames to the static frames, the host outputs an enable instruction in an instructing period of the last dynamic frame, so as to enable the store unit to store data of the first static frame in an image data transmitting period of the first static frame, and output the switching instruction in an instructing period of the first static frame, so as to control the driving module to receive data of a second static frame from the store unit in an image data transmitting period of the second static frame.

4. The display panel driving device according to claim 3, wherein the host synchronizes the frame separating signal output by the driving chip in the synchronizing period according to a vertical synchronization signal, and the frame separating signal instructs a start point of the display period of each frame.

5. The display panel driving device according to claim 1, wherein the host stops providing the image data in the period that the driving module receives the image data from the store unit.

6. The display panel driving device according to claim 1, wherein the driving module comprises:
- a timing controller, coupled to the transmitting interface unit and the store unit, for outputting a driving clock signal according to the image data; and
- a driving unit, coupled to the timing controller, for driving the display panel to display the frames according to the driving clock signal.

* * * * *